(12) United States Patent
Shen et al.

(10) Patent No.: US 11,870,560 B2
(45) Date of Patent: Jan. 9, 2024

(54) GEOGRAPHICAL IDENTIFICATION FORWARDING METHOD AND DEVICE FOR AREA-ORIENTED ADDRESSING

(71) Applicant: ZHEJIANG LAB, Zhejiang (CN)

(72) Inventors: Congqi Shen, Hangzhou (CN);
Shaofeng Yao, Hangzhou (CN);
Zhongxia Pan, Hangzhou (CN);
Hanguang Luo, Hangzhou (CN); Tao Zou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 57 days.

(21) Appl. No.: 17/966,917

(22) Filed: Oct. 17, 2022

(65) Prior Publication Data

US 2023/0047278 A1    Feb. 16, 2023

Related U.S. Application Data

(63) Continuation of application No. PCT/CN2022/072213, filed on Jan. 17, 2022.

(30) Foreign Application Priority Data

May 27, 2021  (CN) .......................... 202110583603.9

(51) Int. Cl.
*H04L 45/00* (2022.01)
*H04L 45/76* (2022.01)
*H04L 45/745* (2022.01)

(52) U.S. Cl.
CPC .............. *H04L 45/76* (2022.05); *H04L 45/54* (2013.01); *H04L 45/745* (2013.01)

(58) Field of Classification Search
None
See application file for complete search history.

(56) References Cited

U.S. PATENT DOCUMENTS 11,323,944 B2 *   5/2022   Tripathi ................ H04W 24/10
2015/0043589 A1   2/2015   Han et al.
2019/0222055 A1   7/2019   Khoche

FOREIGN PATENT DOCUMENTS

CN        104093181 A        10/2014
CN        104320757 A         1/2015
(Continued)

OTHER PUBLICATIONS

International Search Report (PCT/CN2022/072213); dated Mar. 30, 2022.
(Continued)

*Primary Examiner* — Gerald A Smarth
(74) *Attorney, Agent, or Firm* — W&G Law Group (57) ABSTRACT

A geographical identification forwarding method for area-oriented addressing. The geographic location information is used as a transmission identification, and the communication process based on the geographical identification is realized by constructing the SDN-based geographical identification transmission architecture. In this method, a geographical identification is used instead of a traditional IP identification for network transmission, which effectively alleviates the problem of narrow waist of IP single bearing in the current network. At the same time, through a flow table decomposition design, the flow table size of the switch is effectively controlled. The method provided by the present invention can be extended to a plurality of geographical identification areas to realize large-area real-time cross-domain transmission. The method is simple to operate, easy to realize and high in real-time; the method has a wide application range, and can be used to build new networks and improve network performance.

8 Claims, 7 Drawing Sheets

(56) References Cited

FOREIGN PATENT DOCUMENTS

| | | |
|---|---|---|
| CN | 105357024 A | 2/2016 |
| CN | 105471954 A | 4/2016 |
| CN | 105847157 A | 8/2016 |
| CN | 106413019 A | 2/2017 |
| CN | 108040268 A | 5/2018 |
| CN | 113259848 A | 8/2021 |
| CN | 113259859 A | 8/2021 |
| EP | 3070892 A1 | 9/2016 |
| WO | WO-2021209803 A1 * 10/2021 ......... G01C 21/3461 |

OTHER PUBLICATIONS

CN First Office Action(202110583603.9); dated Aug. 19, 2021.
Research-on-VAN-ET-Routing-Algorithm.

* cited by examiner

GEOGRAPHICAL IDENTIFICATION FORWARDING METHOD AND DEVICE FOR AREA-ORIENTED ADDRESSING

CROSS-REFERENCE TO RELATED APPLICATIONS

The present application is a continuation of International Application No. PCT/CN2022/072213, filed on Jan. 17, 2022, which claims priority to Chinese Application No. 202110583603.9, filed on May 27, 2021, the contents of both of which are incorporated herein by reference in their entireties.

TECHNICAL FIELD

The present disclosure relates to the technical field of data/network transmission, in particular to geographical identification forwarding method and device for area-oriented addressing.

BACKGROUND

With the continuous development of network technology and application, especially the emergence and application of big data, cloud computing, artificial intelligence, etc., the Internet has ushered in a new round of revolutions in an accelerated fission manner, prompting subversive changes in all aspects of society, accelerating the deep integration and development of the Internet and the economy and society, and the demand for specialized service bearing in Internet business has emerged.

Faced with the above requirements, the current mainstream technologies can be divided into two categories: one is to propose solutions from the perspective of business applications, mainly in terms of network performance optimization, and a network environment with high bandwidth networks, proprietary networks, and the like is built to provide performance guarantee for business, for example, network function virtualization is used to flexibly provide network services; the other one starts with network protocols, and builds session protocols that are consistent with professional business requirements on the IP layer, such as information center network with content as the addressing mode, identity and location separation network, etc.

In the process of realizing the present invention, the inventor found that the prior art has at least the following problems:

Providing specialized Internet services through business application optimization will bring about a significant increase in network construction expenses, which is difficult to be widely popularized for civil use; in addition, by building a new network on top of the IP layer, the service diversity requirements are met only in the session layer, but addressing with IP is stilled required on the IP layer, which does not solve the problem of IP single bearing in the current network. Solving the IP single bearing is the key technology to break through the rigid network structure and significantly improve the performance. Therefore, it has become a consensus to propose other addressing transmission modes except IP, but there is still a lack of relevant implementation methods to realize the new transmission mode.

SUMMARY

The embodiment of the present disclosure aims to provide geographical identification forwarding method and device for area-oriented addressing, so as to solve the problem of narrow waist of network IP in related technologies.

According to a first aspect of the embodiment of the present disclosure, there is provided a geographical identification forwarding method for area-oriented addressing, which is applied to an SDN switch, the method including:

Receiving a roadside base station's self-geographic location information and coverage area information sent by the roadside base station.

Sending the self-geographic location information and coverage area information to an SDN controller, so that the SDN controller collects the self-geographic location information and coverage area information of the roadside base station, divides geographic areas by using the collected information, and generates a network flow table according to each divided geographic area. One network flow table contains a plurality of flow table entries, each flow table entry contains one matching rule and a flow table action corresponding thereto, and one matching rule contains a plurality of matching fields.

Receiving the network flow table sent by the SDN controller.

Receiving a message, and matching the message with the network flow table. The message is generated by a sender and forwarded through the roadside base station corresponding to the sender, and the message includes geographical location information of the sender and geographical location information of a target addressing area.

Forwarding the message according to the flow table entry in the hit network flow table to the roadside base station corresponding to the target addressing area. The message is broadcast by the roadside base station corresponding to the target addressing area and received by a receiver in the target addressing area.

Further, the step of SDN controller collecting the self-geographic location information and coverage area information of the roadside base station, dividing geographic areas by using the collected information, and generating a network flow table according to each divided geographic area includes:

Receiving the self-geographic location information and coverage area information sent by each roadside base station through an SDN switch. The self-geographic location information is represented by a longitude value and a latitude value, and the coverage area information is represented by a wireless signal coverage radius of the roadside base station.

Converting the self-geographic location information and coverage area information into upper and lower limits of longitude and latitude coverage of the corresponding roadside base station.

Sorting all the upper and lower limits of longitude coverage to form a longitude set, and sorting all the upper and lower limits of latitude coverage to form a latitude set.

Generating a matching rule set according to the longitude set and the latitude set, which is specifically as follows: taking out maximum values and minimum values of the longitude set and the latitude set respectively each time to form a matching rule, and removing the taken maximum and minimum values from the corresponding set until the longitude set and the latitude set become empty sets to obtain a matching rule set. Each matching rule contains two matching fields, namely a longitude range and a latitude range.

Counting the roadside base stations corresponding to each matching rule in the matching rule set, and calculating a port list to be forwarded to the corresponding roadside base station for each switch. The port list is a flow table action corresponding to the matching rule.

Making the matching rules correspond to the flow table actions in a one-to-one manner, and obtaining the network flow table for each switch.

Further, the step of receiving a message, and matching the message with the network flow table includes:

Receiving and analyzing the message to obtain the upper and lower limit values of longitude and latitude coverage of the target addressing area.

Comparing the upper and lower limit values of longitude and latitude coverage with the matching rules in the network flow table, and performing comparison according to the geographical areas corresponding to the matching rules from small to large. In case the upper and lower limits of longitude coverage in the message belong to the longitude range in the matching rules and the upper and lower limits of latitude coverage in the message belong to the latitude range in the matching rules, the message hits the matching rule, and once the message hits a certain matching rule, the message will not be compared with other matching rules.

Further the step of forwarding the message according to the flow table entry in the hit network flow table to the roadside base station corresponding to the target addressing area includes:

Executing a flow table action corresponding to the matching rule that can be matched with the message, copying the message to a forwarding port specified in the flow table action, and forwarding the message to a next hop SDN switch.

The next-hop switch continuing to analyze the message, obtaining the upper and lower limit values of latitude and longitude coverage of the target addressing area, matching the network flow table, and executing the flow table action corresponding to the matched rule until the message is forwarded to the roadside base station in the target addressing area.

According to a second aspect of the embodiment of the present disclosure, there is provided a geographical identification forwarding device for area-oriented addressing, which is applied to an SDN switch, the device including:

A first receiver configured for receiving a roadside base station's self-geographic location information and coverage area information sent by the roadside base station.

A first sender configured for sending the self-geographic location information and coverage area information to an SDN controller, so that the SDN controller collects the self-geographic location information and coverage area information of the roadside base station, divides geographic areas by using the collected information, and generates a network flow table according to each divided geographic area. One network flow table contains a plurality of flow table entries, each flow table entry contains one matching rule and a flow table action corresponding thereto, and one matching rule contains a plurality of matching fields.

A second receiver configured for receiving the network flow table sent by the SDN controller.

A matching processor configured for receiving a message, and matching the message with the network flow table. The message is generated by a sender and forwarded through the roadside base station corresponding to the sender, and the message includes geographical location information of the sender and geographical location information of a target addressing area.

A forwarding processor configured for forwarding the message according to the flow table entry in the hit network flow table to the roadside base station corresponding to the target addressing area. The message is broadcast by the roadside base station corresponding to the target addressing area and received by a receiver in the target addressing area.

According to a third aspect of the embodiment of the present disclosure, there is provided a geographical identification forwarding method for area-oriented addressing, which is applied to an SDN switch, the method comprising:

Receiving a roadside base station's self-geographic location information and coverage area information forwarded by a SDN switch.

Dividing geographical areas by using the geographical location information and the coverage area information, and generating a network flow table according to each divided geographical area.

Sending the network flow table to the SDN switch to trigger the SDN switch to receive the network flow table, matching a message with the network flow table, and forwarding the message according to matched flow table entries to the roadside base station corresponding to a request area. The message is generated by the sender and forwarded through the roadside base station corresponding to the sender, and the message is broadcast by the roadside base station corresponding to a target addressing area and received by a receiver in the target addressing area, and the message includes the geographical location information of the sender and geographical location information of the target addressing area.

Further, the step of dividing geographical areas by using the geographical location information and the coverage area information, and generating a network flow table according to each divided geographical area includes:

Receiving the self-geographic location information and coverage area information sent by each roadside base station through an SDN switch. The self-geographic location information is represented by a longitude value and a latitude value, and the coverage area information is represented by a wireless signal coverage radius of the roadside base station.

Converting the self-geographic location information and coverage area information into upper and lower limits of longitude and latitude coverage of the corresponding roadside base station.

Sorting all the upper and lower limits of longitude coverage to form a longitude set, and sorting all the upper and lower limits of latitude coverage to form a latitude set.

Generating a matching rule set according to the longitude set and the latitude set, which is specifically as follows: taking out maximum values and minimum values of the longitude set and the latitude set respectively each time to form a matching rule, and removing the taken maximum and minimum values from the corresponding set until the longitude set and the latitude set become empty sets to obtain a matching rule set. Each matching rule contains two matching fields, namely a longitude range and a latitude range.

Counting the roadside base stations corresponding to each matching rule in the matching rule set, and calculating a port list to be forwarded to the corresponding roadside base station for each switch. The port list is a flow table action corresponding to the matching rule.

Making the matching rules correspond to the flow table actions in a one-to-one manner, and obtaining the network flow table for each switch.

Further, the step of matching the message with the network flow table includes:

Analyzing the message to obtain the upper and lower limit values of longitude and latitude coverage of the target addressing area.

Comparing the upper and lower limit values of longitude and latitude coverage with longitude and latitude matching rules in the network flow table, and performing comparison according to the geographical areas corresponding to the matching rules from small to large. In case the upper and lower limits of longitude coverage in the message belong to the longitude range in the matching rules and the upper and lower limits of latitude coverage in the message belong to the latitude range in the matching rules, the message hits the matching rule, and once the message hits a certain matching rule, the message will not be compared with other matching rules.

Further, the step of forwarding the message according to matched flow table entries to the roadside base station corresponding to a request area includes:

Executing a flow table action corresponding to the matching rule that can be matched with the message, copying the message to a forwarding port specified in the flow table action, and forwarding the message to a next hop SDN switch.

The next-hop switch continuing to analyze the message, obtaining the upper and lower limit values of latitude and longitude coverage of the target addressing area, matching the network flow table, and executing the flow table action corresponding to the matched rule until the message is forwarded to the roadside base station in the target addressing area.

According to a fourth aspect of the embodiment of the present disclosure, there is provided a geographical identification forwarding device for area-oriented addressing, which is applied to an SDN switch, the device comprising:

A third receiver configured for receiving a roadside base station's self-geographic location information and coverage area information forwarded by a SDN switch.

A generator configured for dividing geographical areas by using the geographical location information and the coverage area information, and generating a network flow table according to each divided geographical area.

A second sender configured for sending the network flow table to the SDN switch to trigger the SDN switch to receive the network flow table, matching a message with the network flow table, and forwarding the message according to matched flow table entries to the roadside base station corresponding to a request area. The message is generated by the sender and forwarded through the roadside base station corresponding to the sender, and the message is broadcast by the roadside base station corresponding to a target addressing area and received by a receiver in the target addressing area, and the message includes the geographical location information of the sender and geographical location information of the target addressing area.

The technical solution provided by the embodiment of the application can include the following beneficial effects.

As can be seen from the above embodiment, this application uses geographic location information such as latitude and longitude to define the target addressing area and construct a message, which overcomes the problem that the current IP network must specify the receiver IP and cannot communicate with the receiver in the specified area, and solves the problem of IP single bearing from the perspective of geographic identification addressing, which has strong practical significance for improving the flexibility of the network structure. In addition, the present disclosure uses geographical area segmentation to generate network flow tables, which solves the problem of explosive growth of flow tables caused by diversification of target addressing areas, and achieves the effect of controllable flow tables in SDN switches.

It should be appreciated that the above general description and the following detailed description are exemplary and explanatory only, and are not intended to limit the present disclosure.

BRIEF DESCRIPTION OF DRAWINGS

The drawings herein are incorporated into and constitute a part of the description, illustrate embodiments conforming to the present disclosure, and serve to explain the principle of the present disclosure together with the description.

DESCRIPTION OF EMBODIMENTS

Exemplary embodiments will be described herein in detail, examples of which are shown in the drawings. When the following description refers to the drawings, unless otherwise indicated, the same numbers in different drawings indicate the same or similar elements. The embodiments described in the following exemplary embodiments do not represent all the embodiments conforming to this application. On the contrary, they are only examples of devices and methods conforming to some aspects of this application as detailed in the appended claims.

The terminology used in this application is for the purpose of describing specific embodiments only, and is not intended to limit this application. The singular forms of "a", "said" and "the" used in this application and the appended claims are also intended to include plural forms, unless the context clearly indicates other meaning. It should also be appreciated that the term "and/or" used herein refers to and includes any or all possible combinations of one or more associated listed items.

It should be appreciated that although the terms "first", "second", "third", etc. may be used in this application to describe various information, such information should not be limited to these terms. These terms are only used to distinguish the same type of information from each other. For example, without departing from the scope of this application, the first information can also be called the second information, and similarly, the second information can also be called the first information. Depending on the context, the word "if" as used here can be interpreted as "when" or "where" or "in response to determining".

Figure 1:
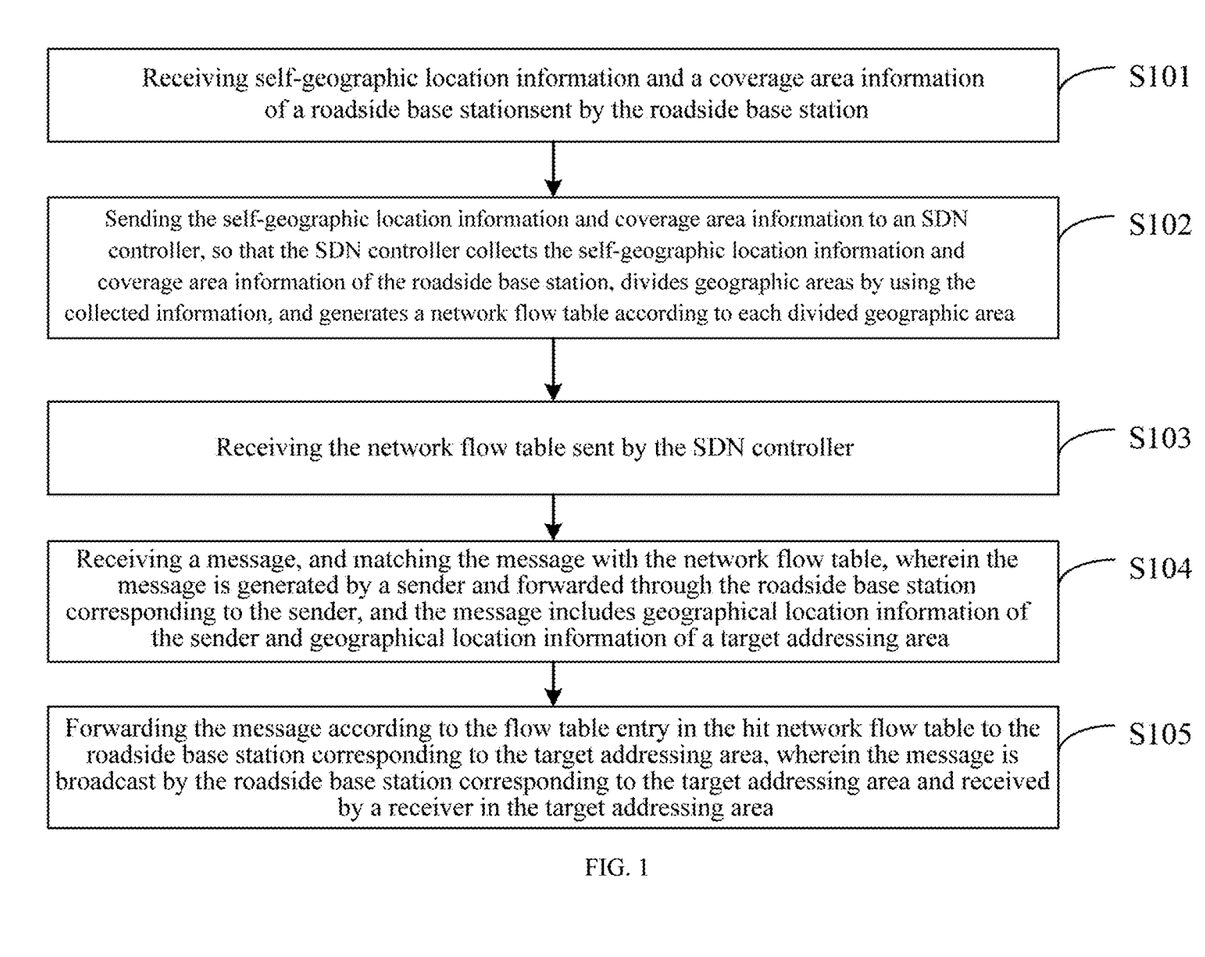
FIG. 1 is a flowchart of a geographical identification forwarding method for area-oriented addressing according to an exemplary embodiment.

FIG. 1 is a system model diagram of a geographical identification forwarding method for area-oriented addressing according to an exemplary embodiment. As shown in FIG. 1, the method is applied to an SDN switch and may include:

S101, receiving a roadside base station's self-geographic location information and coverage area information sent by the roadside base station.

S102, sending the self-geographic location information and coverage area information to an SDN controller, so that the SDN controller collects the self-geographic location information and coverage area information of the roadside base station, divides geographic areas by using the collected information, and generates a network flow table according to each divided geographic area.

S103, receiving the network flow table sent by the SDN controller.

S104, receiving a message, and matching the message with the network flow table. The message is generated by a sender and forwarded through the roadside base station corresponding to the sender, and the message includes geographical location information of the sender and geographical location information of a target addressing area.

S105, forwarding the message according to the flow table entry in the hit network flow table to the roadside base station corresponding to the target addressing area. The message is broadcast by the roadside base station corresponding to the target addressing area and received by a receiver in the target addressing area.

As can be seen from the above embodiment, this application uses geographic location information such as latitude and longitude to define the target addressing area and construct the message, which overcomes the problem that the current IP network must specify the receiver IP and cannot communicate with the receiver in the specified area, and solves the problem of IP single bearing from the perspective of geographic identification addressing, which has strong practical significance for improving the flexibility of network structure. In addition, the present disclosure uses geographical area segmentation to generate network flow tables, which solves the problem of explosive growth of flow tables caused by diversification of target addressing areas, and achieves the effect of controllable flow tables in SDN switches.

Figure 2:
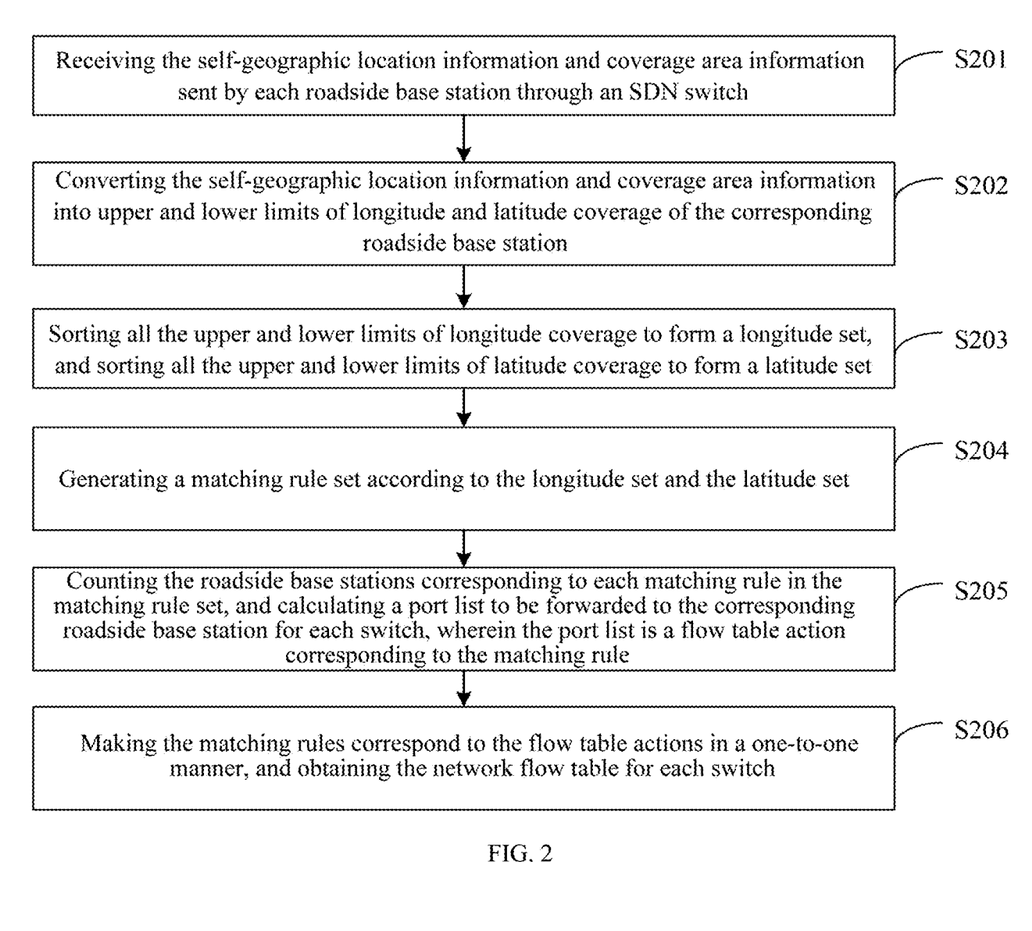
FIG. 2 is a flowchart of step S102 according to an exemplary embodiment.

In the specific implementation of step S101, the geographic location information and coverage area information of the roadside base station are received. Referring to FIG. 2, this step may include:

Receiving the self-geographic location information and coverage area information sent by each roadside base station through an SDN switch. The self-geographic location information is represented by a longitude value and a latitude value, and the coverage area information is represented by a wireless signal coverage radius of the roadside base station.

Specifically, in this embodiment, the switch receives the roadside base station R1's self-geographic location information from the roadside base station R1, which is a longitude 10, a latitude 40, and a coverage radius 10; the roadside base station R2's own geographical location information sent by the roadside base station R2 is a longitude 10, a latitude 10 and a coverage radius 10; the roadside base station R3's own geographical location information sent by the roadside base station R3 is a longitude 25, a latitude 25 and a coverage radius 10; the roadside base station R4's own geographical location information sent by the roadside base station R4 is a longitude 40, a latitude 40 and a coverage radius 10.

In the concrete implementation of step S102, the own geographic position information and the coverage area information are sent to an SDN controller so that the SDN controller collects the self-geographic location information and coverage area information of the roadside base station, divides geographic areas by using the collected information, and generates a network flow table according to each divided geographic area; the configuration of the network flow table is generated by the SDN controller and sent to the SDN switch. Referring to FIG. 2, this step may include:

S201, receiving the self-geographic location information and coverage area information sent by each roadside base station through an SDN switch. The self-geographic location information is represented by a longitude value and a latitude value, and the coverage area information is represented by a wireless signal coverage radius of the roadside base station.

Step 202, converting the self-geographic location information and coverage area information into upper and lower limits of longitude and latitude coverage of the corresponding roadside base station.

In an example, the upper and lower longitude limits for R1 are 20 and 0 respectively; and the upper and lower latitude limits are 50 and 30 respectively; the upper and lower longitude limits of R2 are 20 and 0 respectively, and the upper and lower latitude limits are 20 and 0 respectively; the upper and lower longitude limits of R3 are 35 and 15 respectively, and the upper and lower latitude limits are 35 and 15 respectively; the upper and lower longitude limits R4 are 50 and 30 respectively, and the upper and lower latitude limits are 50 and 30, respectively.

Step 203, sorting all the upper and lower limits of longitude coverage to form a longitude set, and sorting all the upper and lower limits of latitude coverage to form a latitude set.

In an example, the longitude set is {50; 35; 30; 20; 15; 0}, and the latitude is {50; 30; 20; 15; 0};

S204, generating a matching rule set according to the longitude set and the latitude set, which is specifically as follows: taking out maximum values and minimum values of the longitude set and the latitude set respectively each time to form a matching rule, and removing the taken maximum and minimum values from the corresponding set until the longitude set and the latitude set become empty sets to obtain a matching rule set. Each matching rule contains two matching fields, namely a longitude range and a latitude range.

In an example, three matching rules are formed, and each rule includes a longitude matching field and a latitude matching field; the first rule is longitude range (0,50) and latitude range (0,50), the second matching rule is longitude range (15,35) and latitude range (15,35), and the third matching rule is longitude range (20,30) and latitude range (20,30).

Step 205, counting the roadside base stations corresponding to each matching rule in the matching rule set, and calculating a port list to be forwarded to the corresponding roadside base station for each switch. The port list is a flow table action corresponding to the matching rule.

Step 206, making the matching rules correspond to the flow table actions in a one-to-one manner, and obtaining the network flow table for each switch.

Figure 3:
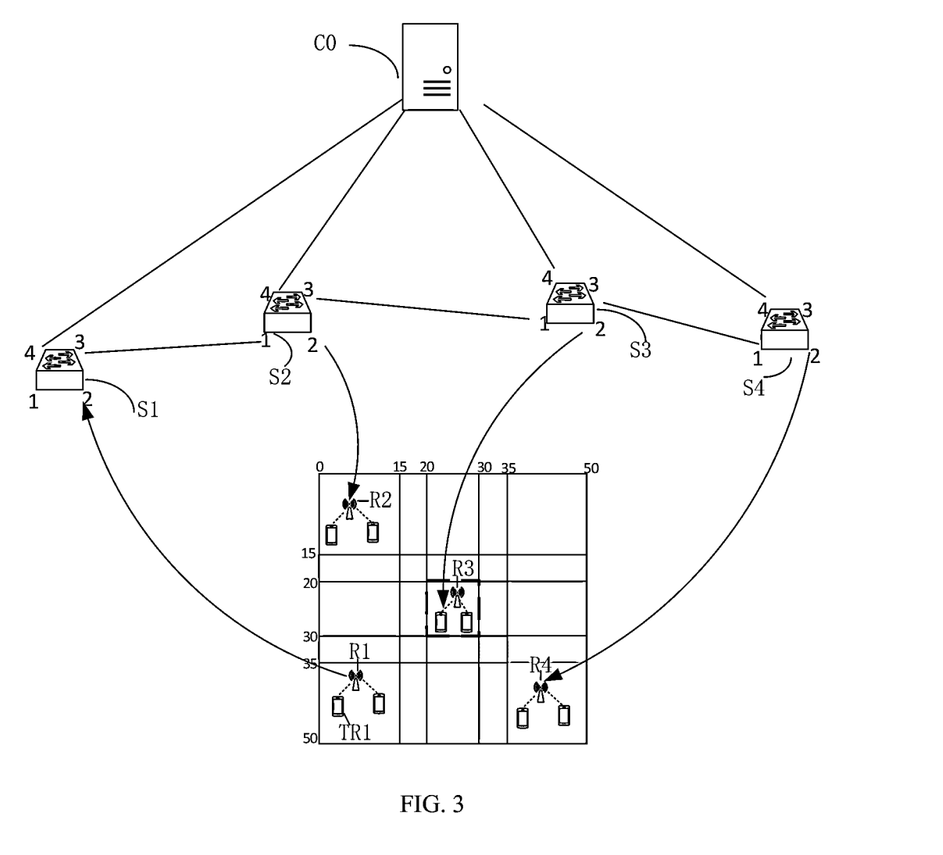
FIG. 3 is a schematic diagram of an application environment of a geographical identification forwarding method for area-oriented addressing according to an exemplary embodiment.

In an example, referring to FIG. 3, FIG. 3 shows the application environment of the geographical identification forwarding method for area-oriented addressing, including an SDN controller CO, four SDN switches, namely an SDN switch S1, an SDN switch S2, an SDN switch S3 and an SDN switch S4, and four roadside base stations, namely a roadside base station R1, a roadside base station R2, a roadside base station R3 and a roadside base station R4. A sender TR1 is connected with the roadside base station R1, and the roadside base station R1 forwards a message sent by TR1 to the switch S1 for forwarding. The SDN controller CO calculates the network flow table and sends the network flow table to four SDN switches. The flow table obtained by the SDN S1 contains three flow table entries. In the first flow table entry, the matching rule is longitude range (20,30) and latitude range (20,30), and forwarding the flow table action from port 3. In the second flow table entry, the matching rule is longitude range (15,35) and latitude range (15,35), and forwarding the flow table action from ports 2 and 3. In the third flow table entry, the matching rule is longitude range (0,50) and latitude range (0,50), and forwarding the flow table action from ports 2 and 3.

The flow table obtained by the SDN S2 contains three flow table entries. In the first flow table entry, the matching rule is longitude range (20,30) and latitude range (20,30), and forwarding the flow table action from port 3. In the second flow table entry, the matching rule is longitude range (15,35) and latitude range (15,35), and forwarding the flow table action from ports 2 and 3. In the third flow table entry, the matching rule is longitude range (0,50) and latitude range (0,50), and forwarding the flow table action from ports 2 and 3.

The flow table obtained by the SDN S3 contains three flow table entries. In the first flow table entry, the matching rule is longitude range (20,30) and latitude range (20,30), and forwarding the flow table action from port 2. In the second flow table entry, the matching rule is longitude range (15,35) and latitude range (15,35), and forwarding the flow table action from ports 2 and 3. In the third flow table entry, the matching rule is longitude range (0,50) and latitude range (0,50), and forwarding the flow table action from ports 2 and 3. The flow table obtained by the SDN S4 contains three flow table entries. In the first flow table entry, the matching rule is longitude range (20,30) and latitude range (20,30), and forwarding the flow table action from port 1. In the second flow table entry, the matching rules are longitude range (15,35) and latitude range (15,35), and forwarding the flow table action from ports 1 and 2. In the third flow table entry, the matching rules are longitude range (0,50) and latitude range (0,50), and forwarding the flow table action from ports 1 and 2.

Figure 4:
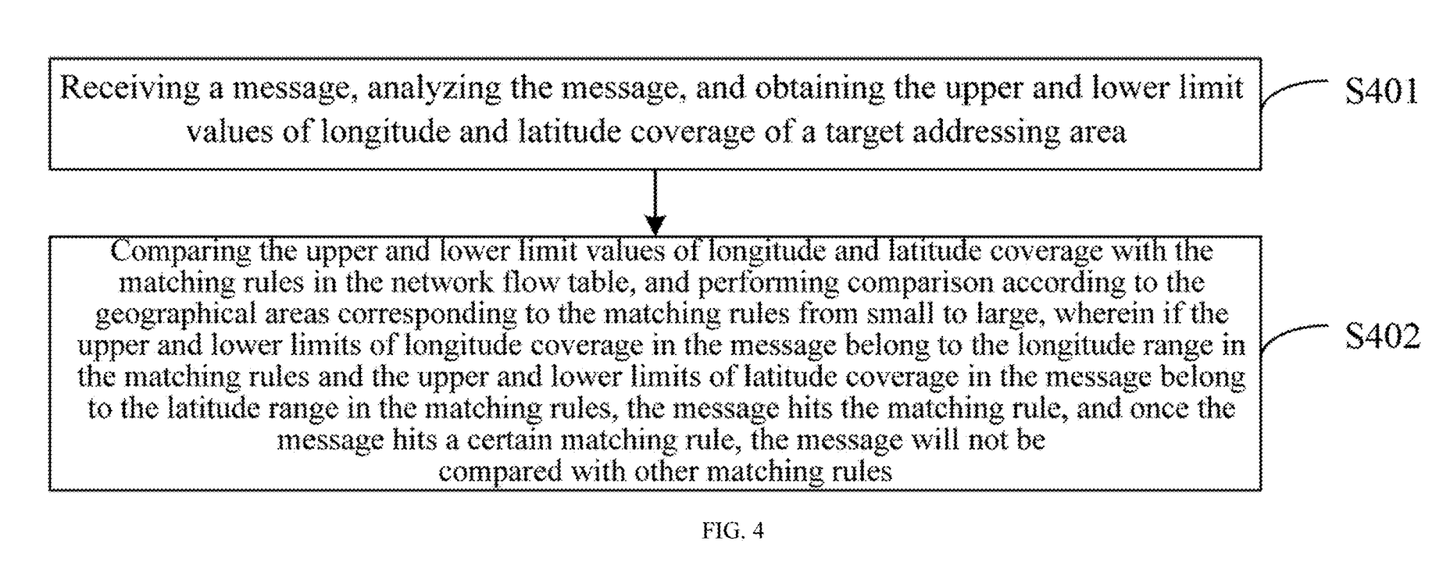
FIG. 4 is a flowchart of step S104 according to an exemplary embodiment.

In the specific implementation of step S104, a message is received and matched with the network flow table. Referring to FIG. 4, this step may include:

S401, receiving a message, analyzing the message, and obtaining the upper and lower limit values of longitude and latitude coverage of a target addressing area.

In an example, the message sent by the sender TR1 and forwarded by the roadside base station R1 is received, and the message includes a basic header, a public header, a data packet sequence number, the geographical location information of the sender itself, the geographical location information of the target addressing area, a message payload, etc.

The basic header includes a message version number, a next message, reserved bits, survival time, and remaining available hops, which occupy 4 bits, 4 bits, 8 bits, 8 bits, and 8 bits, respectively. The survival time represents the queuing time of data packets in the buffer areas of each switch on the forwarding path, and the remaining available hops represent the remaining hops that the message is allowed to be forwarded;

the public header includes a message type, a message subtype, a traffic type, flag bits, a payload length, and a maximum hop count, which occupy 4 bits, 4 bits, 8 bits, 8 bits, 16 bits, and 8 bits, respectively. The message type and message subtype jointly define the message type, and the maximum hop count indicates the maximum hop count of the message on the forwarding path.

The geographical location information of the sender itself includes the address, latitude and longitude information, an accurate identification, a moving speed, a moving direction and other information of a directly connected router, and occupies 64 bit, 32 bit, 32 bit, 1 bit, 15 bit and 16 bit, respectively. The accurate identification refers to whether the latitude and longitude information is accurate.

The geographic location information of the target addressing area includes the longitude information of the center point of the target addressing area, the latitude information of the center point of the target addressing area, the horizontal distance of the target addressing area, and the vertical distance of the target addressing area, which occupy 32 bit, 32 bit, 16 bit, and 16 bit, respectively. When the message type and message subtype in the public header are 3 and 0, respectively, it means that the request area is circular; if the message type and message subtype are 3 and 1, respectively, the request area is rectangular; when the horizontal distance of the target address area is the same as the vertical distance, the rectangle is specialized into a square.

The message payload is the message content defined by the sender TR1.

In this embodiment, assuming that the longitude range and latitude range of the message sent by the sender TR1 are 20 to 30 and 20 to 30, the longitude and latitude of the center point of the target addressing area are 15 and 15 respectively, the horizontal and vertical distances are 10 and 10 respectively, the upper and lower limits of longitude coverage are 30 and 20 respectively, and the upper and lower limits of latitude coverage are 30 and 20 respectively.

S402, comparing the upper and lower limit values of longitude and latitude coverage with the matching rules in the network flow table, and performing comparison according to the geographical areas corresponding to the matching rules from small to large. In case the upper and lower limits of longitude coverage in the message belong to the longitude range in the matching rules and the upper and lower limits of latitude coverage in the message belong to the latitude range in the matching rules, the message hits the matching rule, and once the message hits a certain matching rule, the message will not be compared with other matching rules.

In the embodiment, when the switch S1 closest to the sender TR1 receives the message sent by the sender TR1, it can be obtained by parsing that the upper and lower longitude limits of the target addressing area are 30 and 20, respectively, and the upper and lower latitude limits are 30 and 20, respectively.

Since the geographical area corresponding to the first matching rule is the smallest, SDN switch S1 preferentially matches the first rule. In this embodiment, the upper and lower limits of the latitude and longitude coverage of the target addressing area are all within the latitude and longitude range, which conforms to the matching rule of the first flow entry. Therefore, the message hits the first matching rule, and no longer matches with other rules, thus completing the rule matching.

Figure 5:
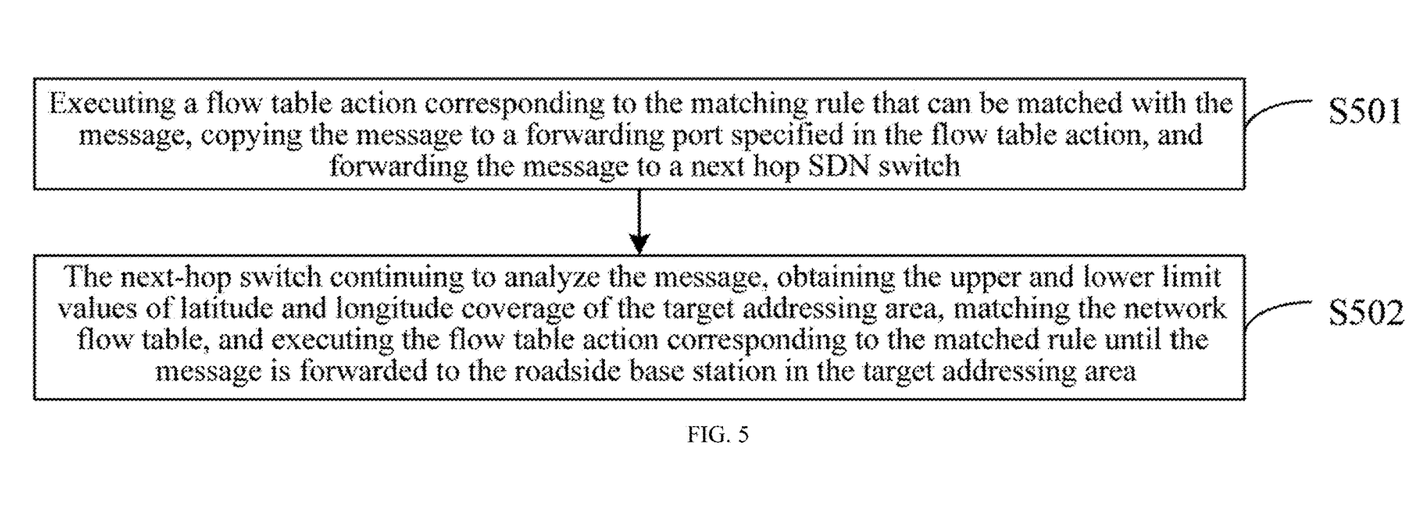
FIG. 5 is a flowchart of step S105 according to an exemplary embodiment.

In the specific implementation of step S105, the step of forwarding according to the matched flow table entry to the roadside base station corresponding to the target addressing area, referring to FIG. 5, may include:

S501, executing a flow table action corresponding to the matching rule that can be matched with the message, copying the message to a forwarding port specified in the flow table action, and forwarding the message to a next hop SDN switch;

In this embodiment, the message matches the first rule of SDN switch S1, so the flow table action corresponding to the first matching rule is executed, that is, the SDN switch S1 forwards the message from port 3 of the SDN switch S1 to a next-hop SDN switch S2.

S502, the next-hop switch continuing to analyze the message, obtaining the upper and lower limit values of latitude and longitude coverage of the target addressing area, matching the network flow table, and executing the flow table action corresponding to the matched rule until the message is forwarded to the roadside base station in the target addressing area.

In an example, when the SDN switch S2 receives the message, the SDN switch S2 parses and obtains that the upper and lower longitude limits of the target addressing area are 30 and 20, respectively, and the upper and lower latitude limits are 30 and 20, respectively, which are matched with the first flow entry of the SDN switch S2, and the message is forwarded from port 3 of the SDN switch S2.

When the message arrives at the SDN switch S3, similarly, the SDN switch S3 parses and obtains that the upper and lower longitude limits of the target addressing area are 30 and 20, and the upper and lower latitude limits are 30 and 20, respectively, which match the first flow entry of the SDN switch S3, and the message is forwarded from the 2 ports of the SDN switch S3.

When the message arrives at the roadside base station R3, the roadside base station R3 broadcasts the message, so that all the receivers in the target addressing area receive the message.

Figure 6:
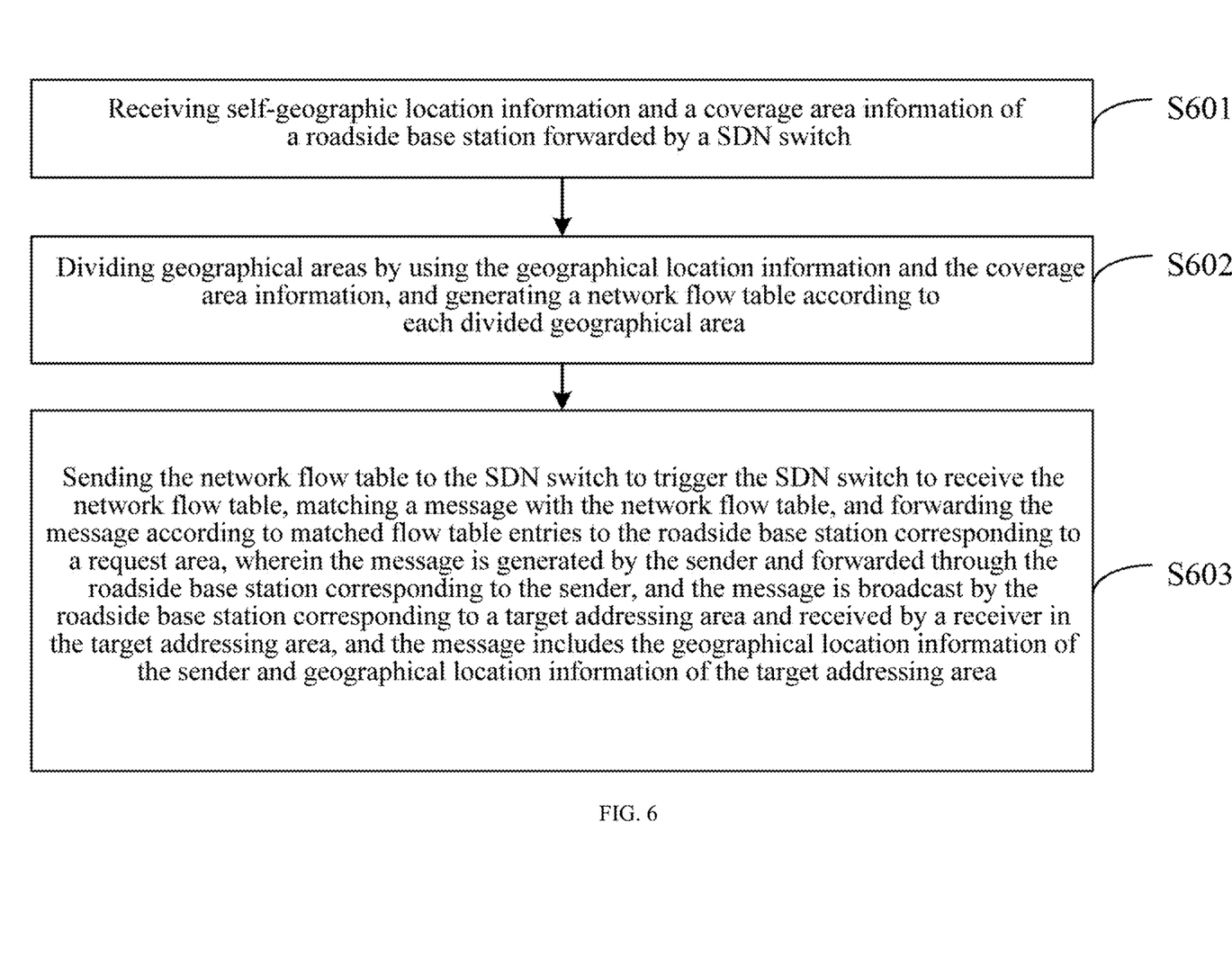
FIG. 6 is a flowchart of another geographical identification forwarding method for area-oriented addressing according to an exemplary embodiment.

Referring to FIG. 6, the embodiment of the present invention also provides a geographic identification forwarding method for area-oriented addressing, which is applied to an SDN controller, and the method includes:

S601, receiving a roadside base station's self-geographic location information and coverage area information forwarded by a SDN switch;

S602, dividing geographical areas by using the geographical location information and the coverage area information, and generating a network flow table according to each divided geographical area;

S603, sending the network flow table to the SDN switch to trigger the SDN switch to receive the network flow table, matching a message with the network flow table, and forwarding the message according to matched flow table entries to the roadside base station corresponding to a request area. The message is generated by the sender and forwarded through the roadside base station corresponding to the sender, and the message is broadcast by the roadside base station corresponding to a target addressing area and received by a receiver in the target addressing area, and the message includes the geographical location information of the sender and geographical location information of the target addressing area.

As can be seen from the above embodiments, this application uses geographic location information such as latitude and longitude to define the target addressing area and construct the message, which overcomes the problem that the current IP network must specify the receiver IP and cannot communicate with the receiver in the specified area, and solves the problem of IP single bearing from the perspective of geographic identification addressing, which has strong practical significance for improving the flexibility of network structure. In addition, the present disclosure uses geographical area segmentation to generate network flow tables, which solves the problem of explosive growth of flow tables caused by diversification of target addressing areas, and achieves the effect of controllable flow tables in SDN switches.

For details of steps S601-S603, please refer to the method provided in the previous embodiment.

Corresponding to the aforementioned embodiment of the geographical identification forwarding method for area-oriented addressing, this application also provides an embodiment of geographical identification forwarding device for area-oriented addressing.

Figure 7:
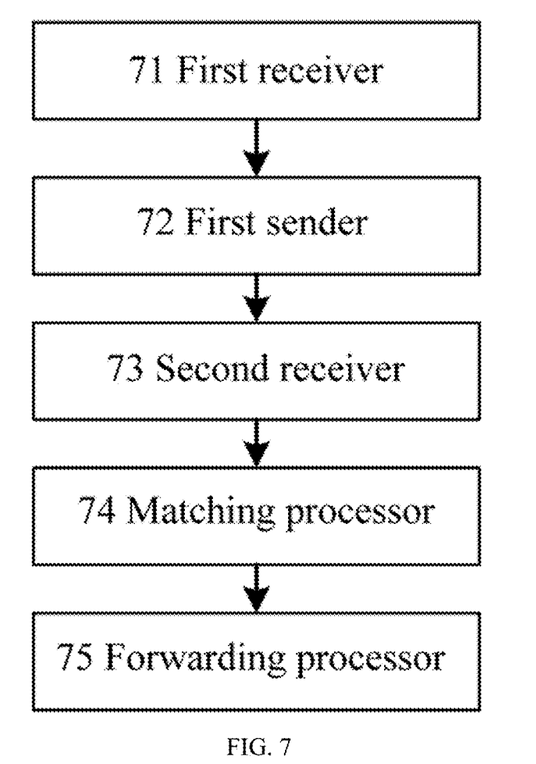
FIG. 7 is a structural diagram of a geographical identification forwarding device for area-oriented addressing according to an exemplary embodiment.

FIG. 7 is a block diagram of a geographical identification forwarding device for area-oriented addressing according to an exemplary embodiment. Referring to FIG. 7, the device is applied to an SDN switch, and the device includes:

A first receiver 71 configured for receiving a roadside base station's self-geographic location information and coverage area information sent by the roadside base station.

A first sender 72 configured for sending the self-geographic location information and coverage area information to an SDN controller, so that the SDN controller collects the self-geographic location information and coverage area information of the roadside base station, divides geographic areas by using the collected information, and generates a network flow table according to each divided geographic area. One network flow table contains a plurality of flow table entries, each flow table entry contains one matching rule and a flow table action corresponding thereto, and one matching rule contains a plurality of matching fields.

A second receiver 73 configured for receiving the network flow table sent by the SDN controller.

A matching processor 74 configured for receiving a message, and matching the message with the network flow table. The message is generated by a sender and forwarded through the roadside base station corresponding to the sender, and the message includes geographical location information of the sender and geographical location information of a target addressing area.

A forwarding processor 75 configured for forwarding the message according to the flow table entry in the hit network flow table to the roadside base station corresponding to the target addressing area. The message is broadcast by the roadside base station corresponding to the target addressing area and received by a receiver in the target addressing area.

Figure 8:
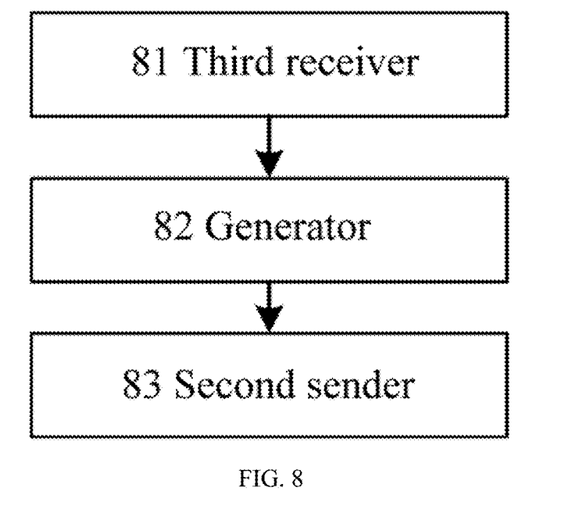
FIG. 8 is a structural diagram of another geographical identification forwarding device for area-oriented addressing according to an exemplary embodiment.

FIG. 8 is a block diagram of another geographical identification forwarding device for area-oriented addressing according to an exemplary embodiment. Referring to FIG. 8, the device is applied to an SDN controller, and includes:

A third receiver 81 configured for receiving a roadside base station's self-geographic location information and coverage area information forwarded by a SDN switch.

A generator 82 configured for dividing geographical areas by using the geographical location information and the coverage area information, and generating a network flow table according to each divided geographical area.

A second sender 83 configured for sending the network flow table to the SDN switch to trigger the SDN switch to receive the network flow table, matching a message with the network flow table, and forwarding the message according to matched flow table entries to the roadside base station corresponding to a request area. The message is generated by the sender and forwarded through the roadside base station corresponding to the sender, and the message is broadcast by the roadside base station corresponding to a target addressing area and received by a receiver in the target addressing area, and the message includes the geographical location information of the sender and geographical location information of the target addressing area.

With regard to the device in the above embodiment, the specific way in which each module performs operations has been described in detail in the embodiment of the method, and will not be explained in detail here.

As for the device embodiment, it basically corresponds to the method embodiment, so please refer to the description of the method embodiment for related parts. The above-described device embodiment is only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the present disclosure solution. Those skilled in the art can understand and implement it without creative labor.

Accordingly, the present disclosure also provides an electronic device, which includes one or more processors; a memory for storing one or more programs; when the one or more programs are executed by the one or more processors, the one or more processors are enabled to realize the geographical identification forwarding method for area-oriented addressing as described above.

Accordingly, the present disclosure also provides a computer readable storage medium on which computer instructions are stored. When executed by a processor, the geographical identification forwarding method for area-oriented addressing is implemented as described above.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

Those skilled in the art will easily think of other embodiments of this application after considering the description and practicing the contents disclosed herein. This application is intended to cover any variations, uses or adaptations of this application, which follow the general principles of this application and include common knowledge or common technical means in the technical field not disclosed in this application. The description and examples are to be regarded as examples only, and the true scope and spirit of this application are indicated by the claims.

It should be appreciated that this application is not limited to the precise structure described above and shown in the drawings, and various modifications and changes can be made without departing from its scope. The scope of this application is limited only by the appended claims

What is claimed is:

1. A geographical identification forwarding method for area-oriented addressing, which is applied to a (Software-Defined Networking) SDN switch, comprising the following steps: receiving self-geographic location information and a coverage area information of a roadside base station sent by the roadside base station; sending the self-geographic location information and the coverage area information to a SDN controller, so that the SDN controller collects the self-geographic location information and coverage area information of the roadside base station, divides geographic areas by using the collected information, and generates a network flow table according to each divided geographic area, wherein the network flow table contains flow table entries, each of the flow table entries contains a matching rule and a flow table action corresponding thereto, and wherein the matching rule contains a plurality of matching fields; receiving the network flow table sent by the SDN controller; receiving a message, and matching the message with the network flow table, wherein the message is generated by a sender and forwarded through the roadside base station corresponding to the sender, and the message comprises geographical location information of the sender and geographical location information of a target addressing area;

forwarding the message according to the flow table entry in the hit network flow table to the roadside base station corresponding to the target addressing area, wherein the message is broadcast by the roadside base station corresponding to the target addressing area and received by a receiver in the target addressing area; wherein said SDN controller collecting the self-geographic location information and coverage area information of the roadside base station, dividing geographic areas by using the collected information, and generating a network flow table according to each divided geographic area comprises: receiving the self-geographic location information and coverage area information sent by each roadside base station through a SDN switch, wherein the self-geographic location information is represented by a longitude value and a latitude value, and the coverage area information is represented by a wireless signal coverage radius of the roadside base station; converting the self-geographic location information and the coverage area information into an upper limit and a lower limit of a longitude coverage and a latitude coverage corresponding to the roadside base station; sorting all upper limits and lower limits of the longitude coverage to form a longitude set, and sorting all upper limits and lower limits of the latitude coverage to form a latitude set; generating a matching rule set according to the longitude set and the latitude set, which comprises: taking out maximum values and minimum values of the longitude set and the latitude set respectively each time to form a matching rule, and removing the maximum values and the minimum values that are taken out from the corresponding longitude set and latitude set until the longitude set and the latitude set become empty sets to obtain a matching rule set, wherein each matching rule contains two matching fields, namely a longitude range and a latitude range; counting the roadside base stations corresponding to each matching rule in the matching rule set, and calculating a port list to be forwarded to the corresponding roadside base station for each switch, wherein the port list is a flow table action corresponding to the matching rule; and making the matching rules correspond to the flow table actions in a one-to-one manner, and obtaining the network flow table for each switch.

2. The method according to claim 1, wherein said receiving a message, and matching the message with the network flow table comprises: receiving and analyzing the message to obtain an upper value and a lower limit value of longitude and latitude coverage of the target addressing area; comparing the upper limit value and the lower limit value of the longitude coverage and the latitude coverage with the matching rules in the network flow table, and performing comparison according to the geographical areas corresponding to the matching rules from small to large, wherein when the upper limit and the lower limit of the longitude coverage in the message belong to the longitude range in the matching rules and the upper limit and the lower limit of the latitude coverage in the message belong to the latitude range in the matching rules, the message hits the matching rule, and once the message hits a certain matching rule, the message is no longer compared with other matching rules.

3. The method according to claim 1, wherein said forwarding the message according to the flow table entry in the hit network flow table to the roadside base station corresponding to the target addressing area comprises: executing a flow table action corresponding to the matching rule capable of being matched with the message, copying the message to a forwarding port specified in the flow table action, and forwarding the message to a next hop SDN switch; analyzing, by the next-hop switch, continuously the message, obtaining an upper limit value and a lower limit value of the latitude coverage and the longitude coverage of the target addressing area, matching the network flow table, and executing the flow table action corresponding to the matching rule matched with the message until the message is forwarded to the roadside base station in the target addressing area.

4. A geographical identification forwarding device for area-oriented addressing, which is applied to a (Software-Defined Networking) SDN switch, comprising: a first receiver configured for receiving self-geographic location information and a coverage area information of a roadside base station sent by the roadside base station; a first sender configured for sending the self-geographic location information and coverage area information to a SDN controller, so that the SDN controller collects the self-geographic location information and the coverage area information of the roadside base station, divides geographic areas by using the collected information, and generates a network flow table according to each divided geographic area, wherein one network flow table contains flow table entries, each of the flow table entry contains a matching rule and a flow table action corresponding thereto, and the matching rule contains a plurality of matching fields; a second receiver configured for receiving the network flow table sent by the SDN controller; a matching processor configured for receiving a message, and matching the message with the network flow table, wherein the message is generated by a sender and forwarded through the roadside base station corresponding to the sender, and the message comprises geographical location information of the sender and geographical location information of a target addressing area; and a forwarding processor configured to forward the message according to the flow table entry in the hit network flow table to the roadside base station corresponding to the target addressing area, wherein the message is broadcast by the roadside base station corresponding to the target addressing area and received by a receiver in the target addressing area; wherein said the SDN controller collecting the self-geographic location information and the coverage area information of the roadside base station, dividing geographic areas by using the collected information, and generating a network flow table according to each divided geographic area comprises: receiving the self-geographic location information and coverage area information sent by each roadside base station through a SDN switch, wherein the self-geographic location information is represented by a longitude value and a latitude value, and the coverage area information is represented by a wireless signal coverage radius of the roadside base station; converting the self-geographic location information and the coverage area information into an upper limit and a lower limit of the longitude coverage and the latitude coverage of the corresponding roadside base station; sorting all upper limits and lower limits of the longitude coverage to form a longitude set, and sorting all upper limits and lower limits of the latitude coverage to form a latitude set; generating a matching rule set according to the longitude set and the latitude set, which comprises: taking out a maximum value and a minimum value of the longitude set and the latitude set respectively each time to form a matching rule, and removing the values maximum and minimum values that are taken out from the corresponding set until the longitude set and the latitude set become empty sets to obtain a matching rule set, wherein each matching rule contains two matching fields, namely a longitude range and a latitude range; counting the roadside base stations corresponding to each matching rule in the matching rule set, and calculating a port list to be forwarded to the corresponding roadside base station for each switch, wherein the port list is a flow table action corresponding to the matching rule; and making the matching rules correspond to the flow table actions in a one-to-one manner, and obtaining the network flow table for each switch.

5. A geographical identification forwarding method for area-oriented addressing, which is applied to (Software-Defined Networking) SDN controller, comprising: receiving self-geographic location information and coverage area information of a roadside base station forwarded by a SDN switch; dividing geographical areas by using the geographical location information and the coverage area information, and generating a network flow table according to each divided geographical area; sending the network flow table to the SDN switch to trigger the SDN switch to receive the network flow table, matching a message with the network flow table, and forwarding the message according to matched flow table entries to the roadside base station corresponding to a request area, wherein the message is generated by the sender and forwarded through the roadside base station corresponding to the sender, and the message is broadcast by the roadside base station corresponding to a target addressing area and received by a receiver in the target addressing area, and the message comprises the geographical location information of the sender and the geographical location information of the target addressing area; wherein said dividing geographical areas by using the geographical location information and the coverage area information, and generating a network flow table according to each divided geographical area comprises: receiving the self-geographic location information and the coverage area information sent by each roadside base station through a SDN switch, wherein the self-geographic location information is represented by a longitude value and a latitude value, and the coverage area information is represented by a wireless signal coverage radius of the roadside base station; converting the self-geographic location information and coverage area information into the upper limit and the lower limit of the longitude coverage and the latitude coverage of the corresponding roadside base station; sorting all upper limits and lower limits of the longitude coverage to form a longitude set, and sorting all upper limits and lower limits of the latitude coverage to form a latitude set; generating a matching rule set according to the longitude set and the latitude set, which comprises: taking out maximum values and minimum values of the longitude set and the latitude set respectively each time to form a matching rule, and removing the maximum values and the minimum values that are taken out from the corresponding set until the longitude set and the latitude set become empty sets to obtain a matching rule set, wherein each matching rule contains two matching fields, namely a longitude range and a latitude range; counting the roadside base stations corresponding to each matching rule in the matching rule set, and calculating a port list to be forwarded to the corresponding roadside base station for each switch, wherein the port list is a flow table action corresponding to the matching rule; and making the matching rules correspond to the flow table actions in a one-to-one manner, and obtaining the network flow table for each switch.

6. The method according to claim 5, wherein said matching the message with the network flow table comprises: analyzing the message to obtain the upper limit values and lower limit values of the longitude coverage and the latitude coverage of the target addressing area; comparing the upper limit value and lower limit value of the longitude coverage and the latitude coverage with longitude and latitude matching rules in the network flow table, and performing comparison according to the geographical areas corresponding to the matching rules from small to large, wherein when the upper limit and the lower limit of the longitude coverage in the message belong to the longitude range in the matching rules and the upper limit and the lower limit of the latitude coverage in the message belong to the latitude range in the matching rules, the message hits the matching rule, and once the message hits a certain matching rule, the message is no longer compared with other matching rules.

7. The method according to claim 5, wherein said forwarding the message according to matched flow table entries to the roadside base station corresponding to a request area comprises: executing a flow table action corresponding to the matching rule capable of being matched with the message, copying the message to a forwarding port specified in the flow table action, and forwarding the message to a next hop SDN switch; the next-hop switch continuing to analyze the message, obtaining the upper and lower limit values of latitude and longitude coverage of the target addressing area, matching the network flow table, and executing the flow table action corresponding to the matched rule until the message is forwarded to the roadside base station in the target addressing area.

8. A geographical identification forwarding device for area-oriented addressing, which is applied to a SDN controller, comprising: a third receiver configured for receiving a roadside base station's self-geographic location information and coverage area information forwarded by a SDN switch; a generator configured for dividing geographical areas by using the geographical location information and the coverage area information, and generating a network flow table according to each divided geographical area with the method according to claim 5; a second sender configured for sending the network flow table to the SDN switch to trigger the SDN switch to receive the network flow table, matching a message with the network flow table, and forwarding the message according to matched flow table entries to the roadside base station corresponding to a request area, wherein the message is generated by the sender and forwarded through the roadside base station corresponding to the sender, and the message is broadcast by the roadside base station corresponding to a target addressing area and received by a receiver in the target addressing area, and the message comprises the geographical location information of the sender and the geographical location information of the target addressing area.

* * * * *